United States Patent [19]
Groten et al.

[11] Patent Number: 5,661,983
[45] Date of Patent: Sep. 2, 1997

[54] FLUIDIZED BED DESICCANT COOLING SYSTEM

[75] Inventors: Barney Groten, Bellevue; Tahir Cader, Woodinville; Richard Tidball, Issaquah, all of Wash.

[73] Assignee: Energy International, Inc., Bellevue, Wash.

[21] Appl. No.: 460,500

[22] Filed: Jun. 2, 1995

[51] Int. Cl.⁶ ............................ F25D 23/00; F25D 17/06
[52] U.S. Cl. ........................ 62/271; 62/94; 62/57
[58] Field of Search .................. 62/271, 92, 94, 62/57

[56] References Cited

U.S. PATENT DOCUMENTS

| | | |
|---|---|---|
| 3,774,374 | 11/1973 | DuFour et al. ............... 35/316 |
| 3,828,528 | 8/1974 | Weil ............................ 55/388 |
| 3,844,737 | 10/1974 | Mocriss et al. ............... 55/34 |
| 4,113,004 | 9/1978 | Rush et al. ................... 165/3 |
| 4,474,021 | 10/1984 | Harband ....................... 62/94 |
| 4,660,385 | 4/1987 | Macriss et al. ............... 62/57 |
| 5,251,458 | 10/1993 | Taherner ...................... 62/271 |

*Primary Examiner*—William Doerrler
*Attorney, Agent, or Firm*—Miller Nash Wiener Hager & Carlsen LLP

[57] ABSTRACT

An air conditioning system utilizes parallel fluidized bed desiccators for reducing the temperature and humidity of supply air. While one fluidized bed removes moisture from the supply air, the other is regenerated by a heated air flow. Use of the two beds is cycled back and forth between moisture removal and regeneration during operation of the system.

9 Claims, 6 Drawing Sheets

FLUIDIZED BED DESICCANT COOLING SYSTEM

TECHNICAL FIELD

The present invention generally relates to air conditioning systems. More particularly, it relates to Pennington cycle and similar types of air conditioning systems which utilize desiccants for drying and cooling air.

BACKGROUND INFORMATION

Most air conditioning systems operate under the Rankine cycle. These systems usually have an electrically driven compressor that increases the pressure and temperature of a refrigerant. While in this condition, the refrigerant is passed through a radiator, or the like, which allows heat exchange with ambient temperatures. This lowers the refrigerant temperature while maintaining an elevated pressure. Afterward, the refrigerant is depressurized by expansion through an orifice. This causes its temperature to be cooled to well below ambient. The cold refrigerant is then used in a heat exchanger to produce a cool or cold supply of air. As a result, the temperature of the refrigerant increases in the heat exchanger. It is cooled once again by compression and heat exchange in a repeat of the sequence just described.

Desiccant cooling systems have been used as an alternative to Rankine cycle and other kinds of air conditioning systems. Desiccant cooling involves the use of an adsorption/desorption cycle. They are known as Pennington cycle systems when all the air supplied to the conditioned space comes from the ambient. Some systems recirculate air from the conditioned space or, perhaps, use a combination of ambient and recirculated air.

In the typical desiccant system, a fresh supply of ambient air is brought into contact with a desiccant material. The desiccant decreases the humidity, and, at the same time, the energy released during adsorption ("heat of adsorption") causes the temperature of the air to increase. The air temperature is then reduced—first by a sensible heat exchanger and then by an adiabatic humidifier. After leaving the humidifier, the supply is relatively dry and cooler than its original ambient temperature.

There are many variations of Rankine and desiccant type systems which utilize the basic modes of cooling generally described above for each system. Rankine systems have the capability of providing a greater range of cooling than desiccant systems, but at a greater energy cost. However, there is a disadvantage associated with Rankine systems in that they commonly use chlorofluorocarbons or other undesireable chemicals as refrigerants, some of which are toxic.

Chlorofluorocarbons have been identified as chemical agents which are potentially harmful to the environment. Notably, they have been linked to ozone depletion of the atmosphere. Other refrigerants such as ammonia or sulfur dioxide are toxic and can be hazardous or flammable if released from the system.

Desiccant systems provide a more environmentally benign way of providing air conditioning. Not only can they be used to cool air, but they can also remove certain environmental contaminants in the air as it is supplied to a room or other conditioned space.

A common operational characteristic of desiccant systems is that the desiccant eventually becomes saturated with moisture and must be regenerated in some fashion. In the known prior art, this has usually been done by mounting the desiccant on a wheel that rotates continually.

A portion of the wheel is in the path of the supply air which is being cooled and exhausted to a room or space requiring conditioned air. Another portion of the wheel is in the path of a heated airstream. As the wheel rotates, individual wheel section areas are alternately impacted by the supply air, from which moisture is adsorbed, and then by the heated air which regenerates the desiccant. This type of system has several major limitations.

First, a wheel apparatus can only carry a fixed amount of desiccant. This fixes the conditions of moisture adsorption and desorption by regeneration in a relatively inflexible manner. Second, the wheel must be relatively large because of the structural matrix required to support the desiccant material. Usually, some kind of honeycomb arrangement is utilized to hold the desiccant in place as the wheel rotates. Third, driving the wheel in rotation requires energy which detracts from the system's overall operating efficiency. Last, the manufacturing and maintenance costs associated with the wheel drives up system costs. Part of the maintenance problem associated with a wheel is that, over time, the desiccant may degrade or be lost from the system necessitating replacement. It is difficult to replace the desiccant alone in a wheel structure without replacing the entire wheel.

The purpose of the present invention is to provide a desiccant cooling system that eliminates the disadvantages of the rotating wheel system described above.

SUMMARY OF THE INVENTION

The invention is a Pennington cycle air conditioning system which utilizes parallel fluidized beds of desiccant material ("desiccators") to provide air conditioning. Supply air is driven through the system by one or more blowers. The supply air first enters a transfer plenum which directs it into one of two desiccators.

Each desiccator is sized and shaped for holding particles of a suitable desiccant material. Each desiccator has a support surface or air distribution plate underlying the desiccant particles. The distribution plate is either made of a screen or a solid plate having perforations for allowing the supply air to be driven or blown upwardly through the desiccant particles. As this happens, moisture in the air is adsorbed by the particles.

Although the adsorption process increases the temperature of the air, it reduces the total energy present in or carried by the air, because its humidity is significantly reduced. After exiting the desiccator, the air passes first through a sensible heat exchanger, where it is cooled, and then through a humidifier where its moisture content is increased and temperature is reduced further. At that point, the supply air is fully conditioned and exhausted into a room or other space requiring conditioned air.

Over a period of time, the desiccant particles will essentially reach a saturation point where they can no longer adsorb additional moisture from the supply air. At that point, the flow of supply air is switched over to the other desiccator by operation of the transfer plenum.

At the same time the supply air is demoisturized by one desiccator, the system uses return air from the conditioned space to regenerate or demoisturize the other desiccator. The parallel desiccators are continually cycled between use as a moisture removing device and regeneration.

Prior to use as a regenerating agent, the return air is first cooled slightly by passing it through a humidifier. Then, it is heated by a sensible heat exchanger. Preferably, the sensible heat exchanger used to cool the supply air is combined in operation with the sensible heat exchanger used to heat the return air. The heat removed from the supply air by one is transferred and added to the return air by the other.

After passing through the sensible heat exchanger, the temperature of the return air is further increased by a regeneration heater. Preferably, the regeneration heater is a natural gas burner system, much like that which is presently used in residential furnaces. However, electrical heat or other sources of heat could be employed for regeneration. The heated air leaves the regeneration heater and is passed through the saturated desiccant (while the other one is used to condition the supply air), thus removing its retained moisture.

An air conditioning system in accordance with the invention will replace wheel-based desiccant cooling systems. It is estimated that an air conditioning unit can be built in accordance with the invention that is estimated to be 40 percent smaller in size than wheel-based systems. Moreover, a system constructed in this manner is more flexible in that it allows the amount of desiccant material used to be varied easily and replaced inexpensively, if necessary. Last, the invention is less expensive than wheel-based systems, because it eliminates the costs associated with manufacturing, mounting, sealing, providing a drive train, and maintaining desiccant wheels.

The invention as summarized above will become more clearly understood upon review of the following description which is to be taken in conjunction with the attached drawings.

BRIEF DESCRIPTION OF THE DRAWINGS

In the drawings, like reference numerals refer to like parts throughout the various views, unless specifically indicated otherwise, and wherein.

BEST MODE FOR CARRYING OUT THE INVENTION

Figure 1:
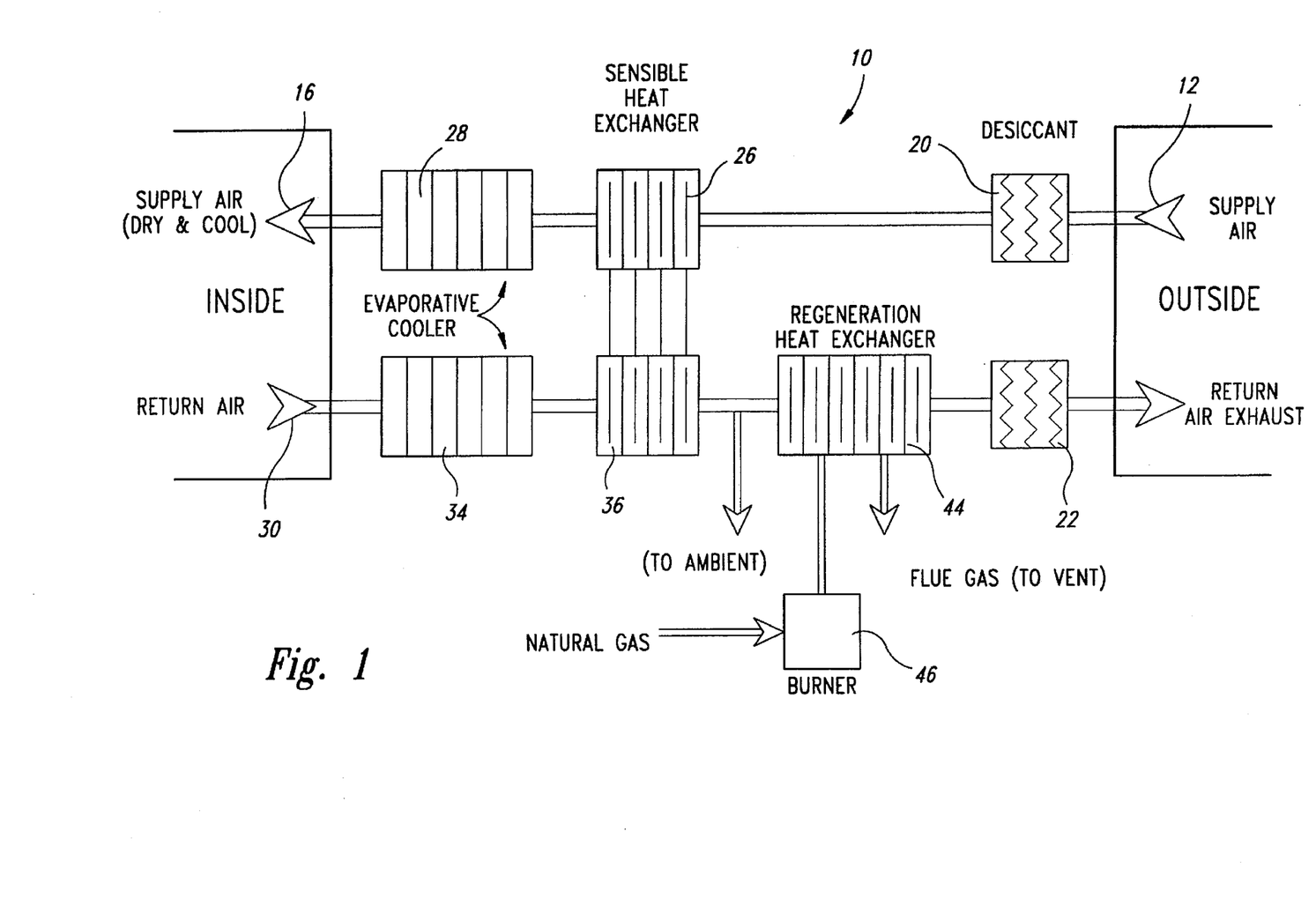
FIG. 1 is a schematic view of a desiccant air conditioning system constructed in accordance with a preferred embodiment of the invention.
Figure 2:
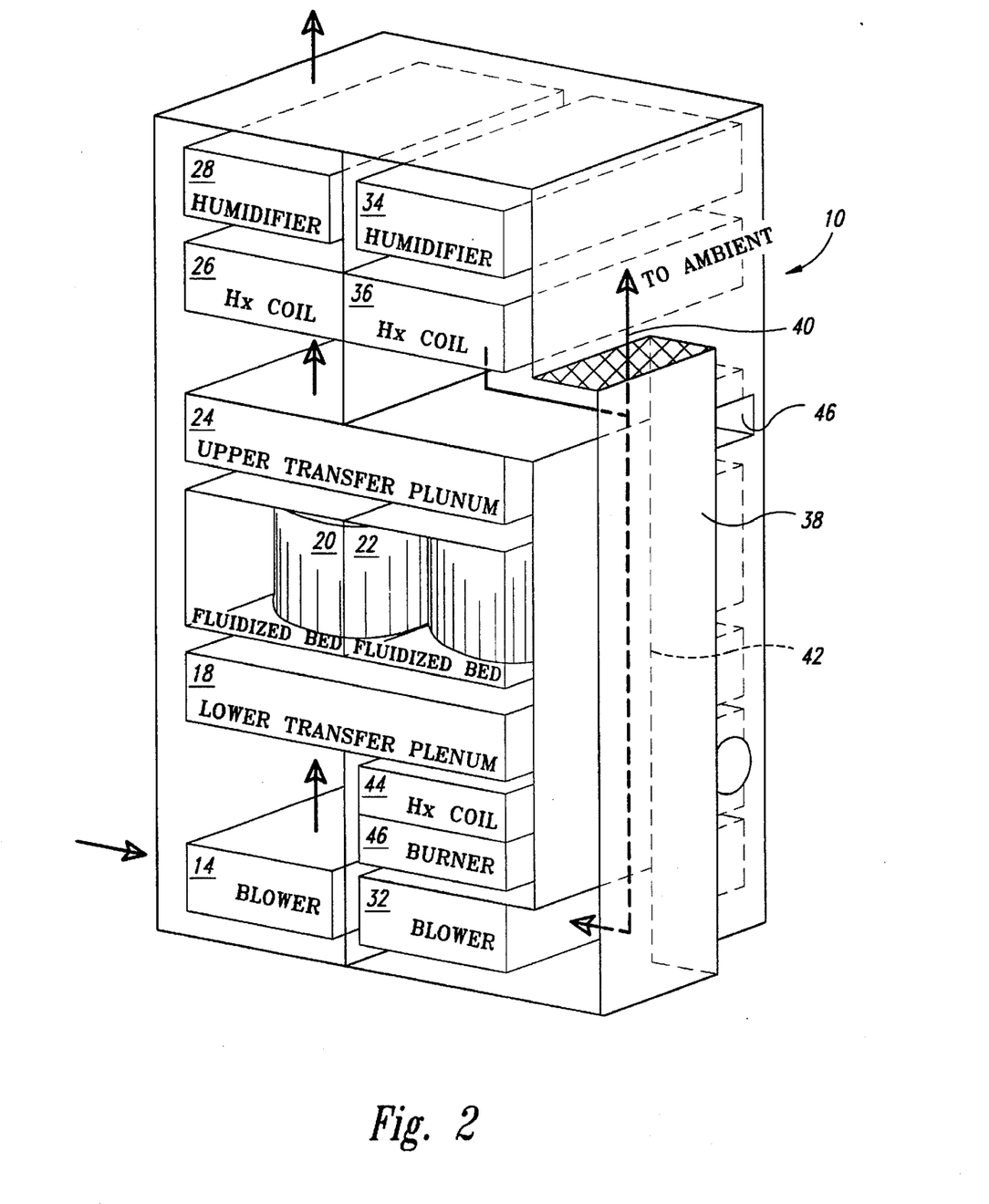
FIG. 2 is a pictorial view of a desiccant air conditioning system constructed in accordance with the invention.
Figure 3:
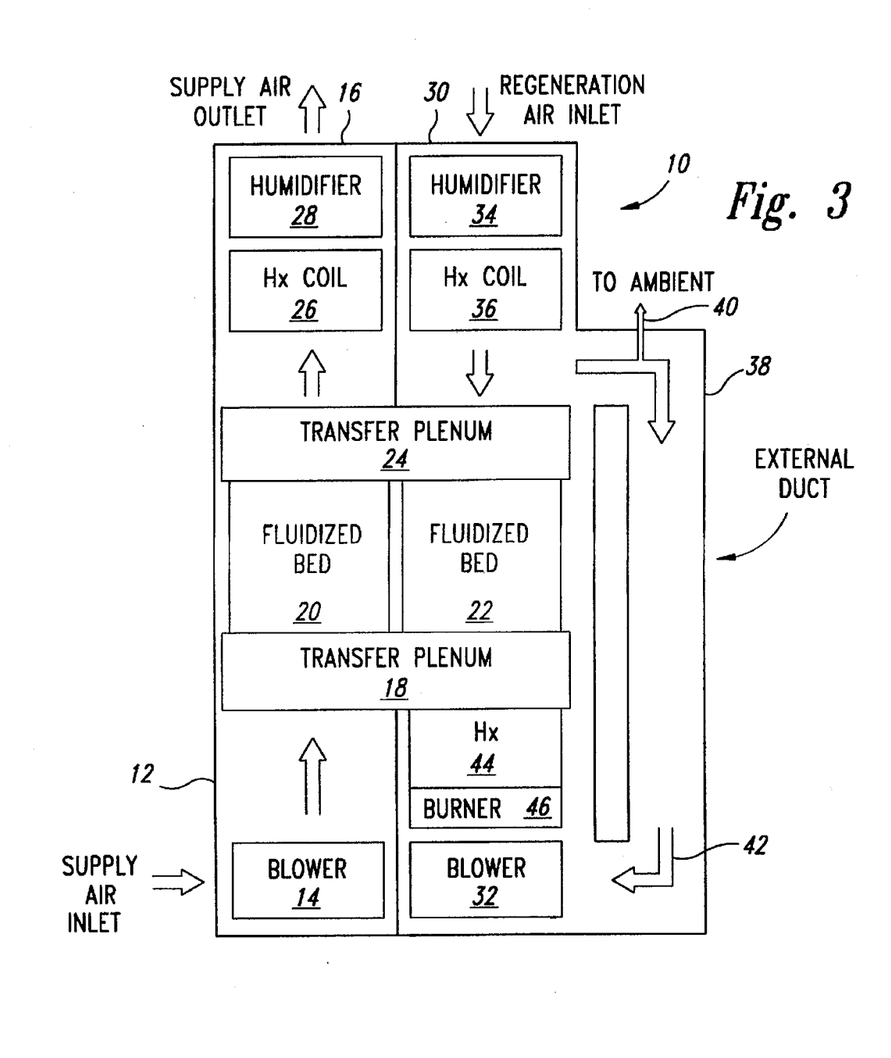
FIG. 3 is a frontal view of the system shown in FIG. 2.

Referring now to the drawings, and first to FIG. 1, shown generally at 10 is an air conditioning system or device constructed in accordance with a preferred embodiment of the invention. FIGS. 2 and 3 show the system 10 in what is believed to be a preferred hardware configuration. Directing attention there, supply air from outside the building or airspace which is to be conditioned is drawn into the system 10 through an air inlet 12 by a first blower 14. The blower drives the supply air along a supply air path until it exits the device 10 as shown at 16.

Downstream of the blower 14 is a first or lower transfer plenum 18. The first plenum 18 receives the supply air, which may be from the inside, outside, or combination of sources. The air is then transferred to one of two selected fluidized bed desiccators 20, 22, which are further described below.

The supply air exits the selected fluidized bed 20, 22 and enters a second or upper transfer plenum 24. There, the supply air is directed to a first sensible heat exchanger 26. After passing through the sensible heat exchanger 26, the air passes through a first evaporative cooler or humidifier 28.

The system 10 removes and regenerates air from the conditioned space at the same time conditioned air is supplied to the space, as indicated generally at 30. The flow of air returned for regeneration ("return air") is driven by a second blower 32. The second blower 32 draws the return air 30 into a second evaporative cooler or humidifier 34. Downstream of the cooler 34 is a second sensible heat exchanger 36. The return air then passes into an external duct 38. There, its flow is split, with some being exhausted to the outside or ambient, as shown at 40, and the remainder 42 being drawn or driven by the blower 32 into a regeneration heater 44.

The regeneration heater 44 may take many forms. In preferred form, it is an indirect heat exchanger having a natural gas burner 46 which uses hot flue gases to heat the return air. The burner 46 raises the temperature of the return air 42 and it is thereafter transferred back to the first plenum 18. The flue gas does not come into direct contact with the return air in the heat exchanger. It is exhausted directly to the ambient.

As previously described, only one fluidized bed desiccator 20, 22 is used at a time in order to provide supply air to the conditioned space. The desiccator in use adsorbs and removes moisture from the supply air. While one desiccator is adsorbing moisture, the other goes through a regeneration cycle by receiving heated return air 42 from the lower transfer plenum 18. The heated air demoisturizes the regenerating desiccator as the air passes through the desiccator into the second transfer plenum 24. The second transfer plenum 24 then vents the exhaust to the ambient, as shown at 46 in FIG. 2.

Figure 5:
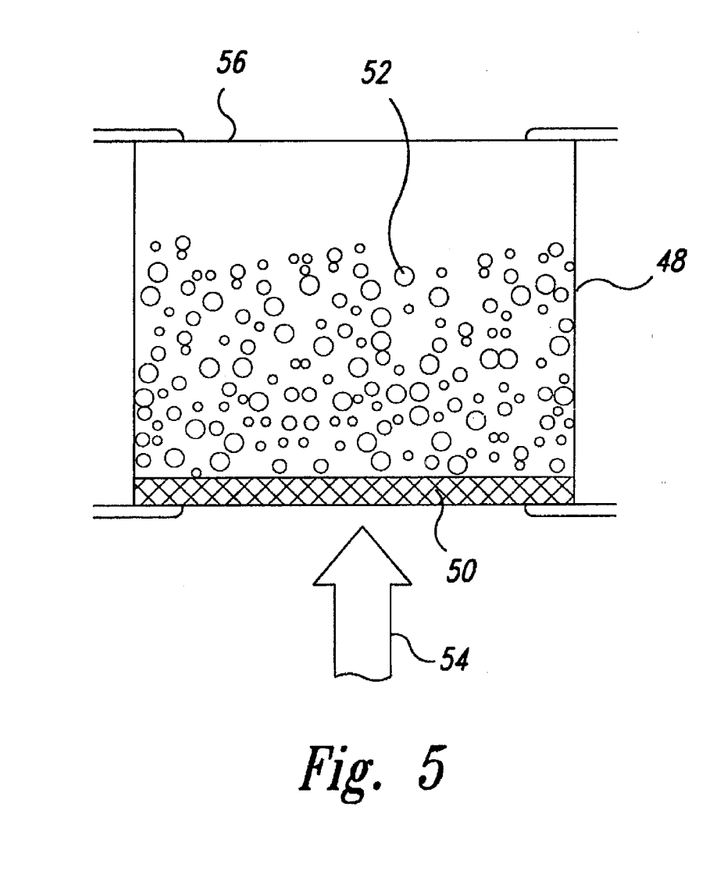
FIG. 5 is a side cross-sectional view of a fluidized bed desiccator.
Figure 6:
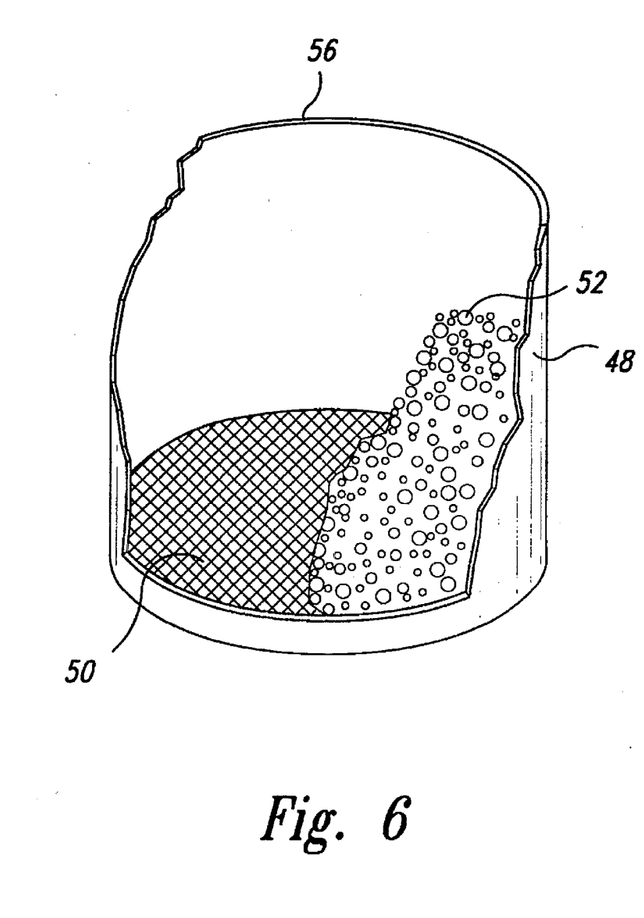
FIG. 6 is a cut-away pictorial view of the fluidized bed desiccator shown in FIG. 5.

The construction of each desiccator 20, 22 is better seen in FIGS. 5 and 6. Directing attention there, each desiccator is made of a cylindrical chamber, indicated generally at 48. The bottom of the chamber is a plate structure or distribution plate 50. The plate 50 could be solid with a number of small perforations for allowing air to pass from the first transfer plenum 18 into the chamber 48, or it could be constructed from a screen. Regardless of its construction, it is important that the plate 50 permit an even flow of air upwardly into the chamber in a flux that is constant across the diameter of the chamber 48.

Retained within the chamber 48 are particles of a desiccant material, indicated generally at 52. These particles are small in size and preferably spherical in shape. Supply or return air, as the case may be, is blown upwardly through the plate structure 50 in the direction indicated by arrow 54.

The pressure of the airflow 54 fluidizes the bed of particles 52. The airflow 54 thereafter exits the chamber 48 through its top 56 and enters the second transfer plenum 24. FIG. 6 is a pictorial view of the chamber 48 showing it partially cut-away to reveal the floor or chamber plate structure 50. It is necessary that the gauge of the screen mesh, or the size of perforations, as the case may be, be small enough to retain the desiccant particles.

As is apparent, the construction of the desiccators 20, 22 enables the amount of desiccant material 52 to be varied easily by adjusting the level of material in the chamber 48. Also, the material 52 is easily removed and replaced, if necessary.

Figure 4:
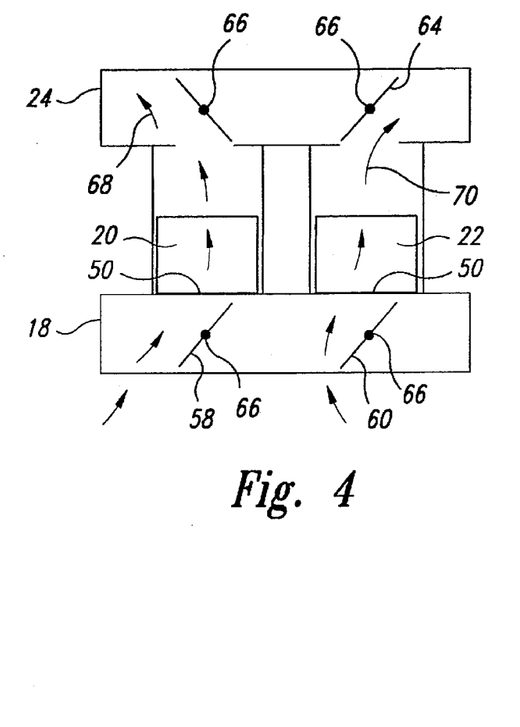
FIG. 4 is a schematic view of a damper system for controlling the use and regeneration of parallel fluidized bed desiccators.

The flow of supply and return air through the first and second plenums 18, 24 is controlled by conventional dampers. Referring to FIG. 4, for example, each plenum 18, 24 may have two or more dampers 58, 60, 62, 64. Each damper 58, 60, 62, 64 is rotatable about a pivot point 66. When rotated into the position shown in FIG. 4, supply air coming from the blower 14 passes through the left-hand fluidized bed 20 and up into the second transfer plenum 24, as shown at 68. There, it passes on to the first sensible heat exchanger 26 and is processed in the manner generally described above.

Each damper 58, 60, 62, 64 may be individually controlled or all may rotate at the same time. It is possible that a larger number of dampers may be required in order to achieve the flow patterns described above. However, the type of arrangement needed would be apparent, and plenum/damper structures of the kind illustrated in FIG. 4 are well-known by those skilled in the art. Rotating the dampers 58, 60, 62, 64 enables the selection of one desiccator 20, 22 for adsorption and the other for regeneration.

At the same time the supply air passes through the left-hand fluidized bed 20, the return air, after heating in the regeneration heater 44, passes through the right-hand bed 22 in the manner shown by arrows 70 in FIG. 4. The return air then exhausts from the device at 46 as was previously described.

Figure 8:
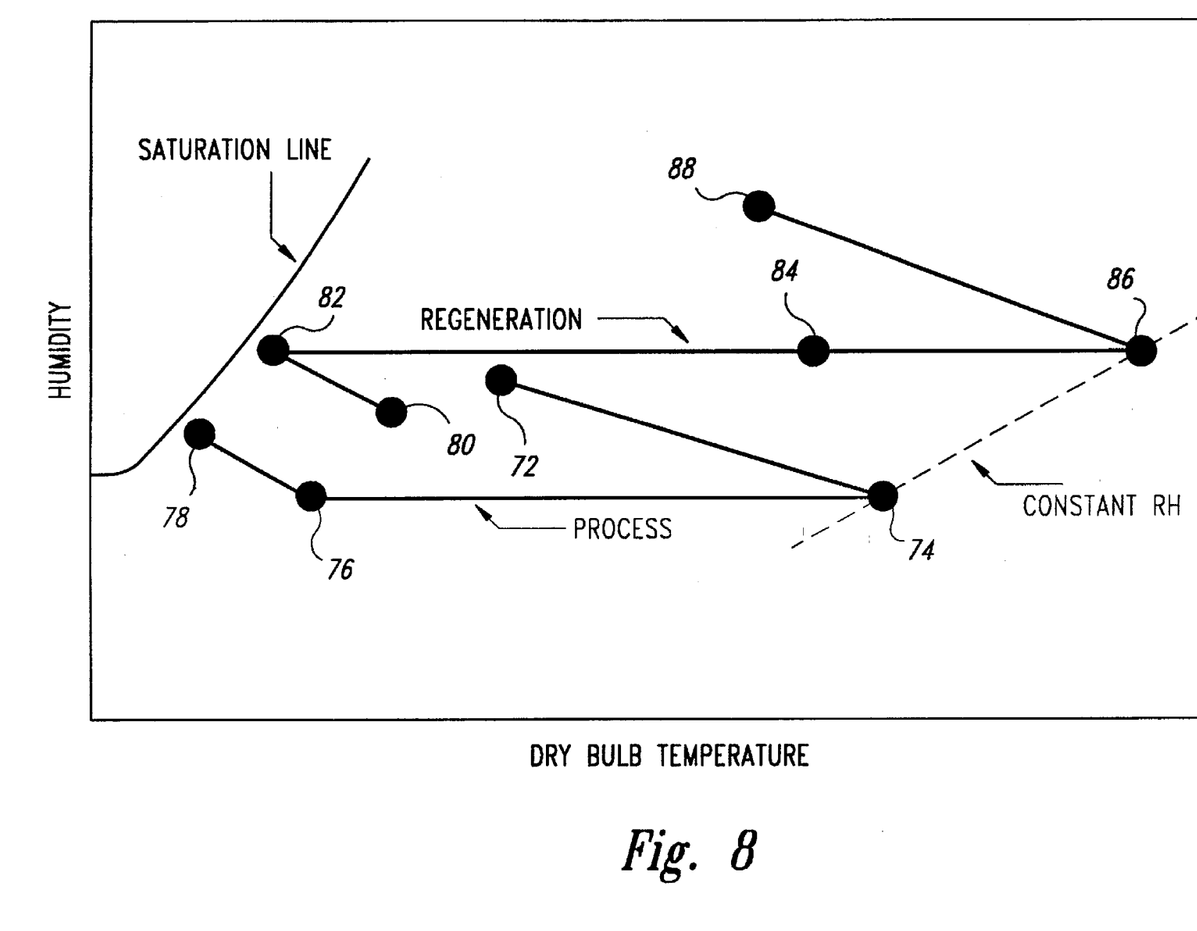
FIG. 8 is a psychrometric chart showing the operation of the desiccant cooling system.

FIG. 8 is a psychrometric chart illustrating the operation of the air conditioning system 10. Supply air enters the system at 72 (see Reference Numeral 12 in FIG. 3). As it passes through one fluidized bed desiccator (20, for example), the desiccant material in the fluidized bed adsorbs moisture and causes the air temperature to increase, as shown at 74. Then, the supply air passes through the first heat exchanger which reduces its temperature while maintaining constant humidity, as shown at 76. As the air passes through the first evaporative cooler, its temperature is reduced further, as shown at 78. At that point, it exits the system. The temperature drop of the supply air from the time it enters the system 10 until it is exhausted is the difference between the location of points 72 and 78 in FIG. 8.

As would be expected, the return air is warmer and more humid, as indicated at 80. During the regeneration process described above, the return air is cooled slightly as it passes through the second evaporative cooler 34 (indicated at 82 in FIG. 8). Then, as the return air passes through the second sensible heat exchanger 36, its temperature is raised, as shown at 84. Its temperature is raised further by the regeneration heater 44, as shown at 86. As the return air passes through the other fluidized bed desiccator (22, for example), it removes the moisture retained by the desiccant particles. This causes a drop in temperature and a rise in humidity as shown at 88.

Figure 7:
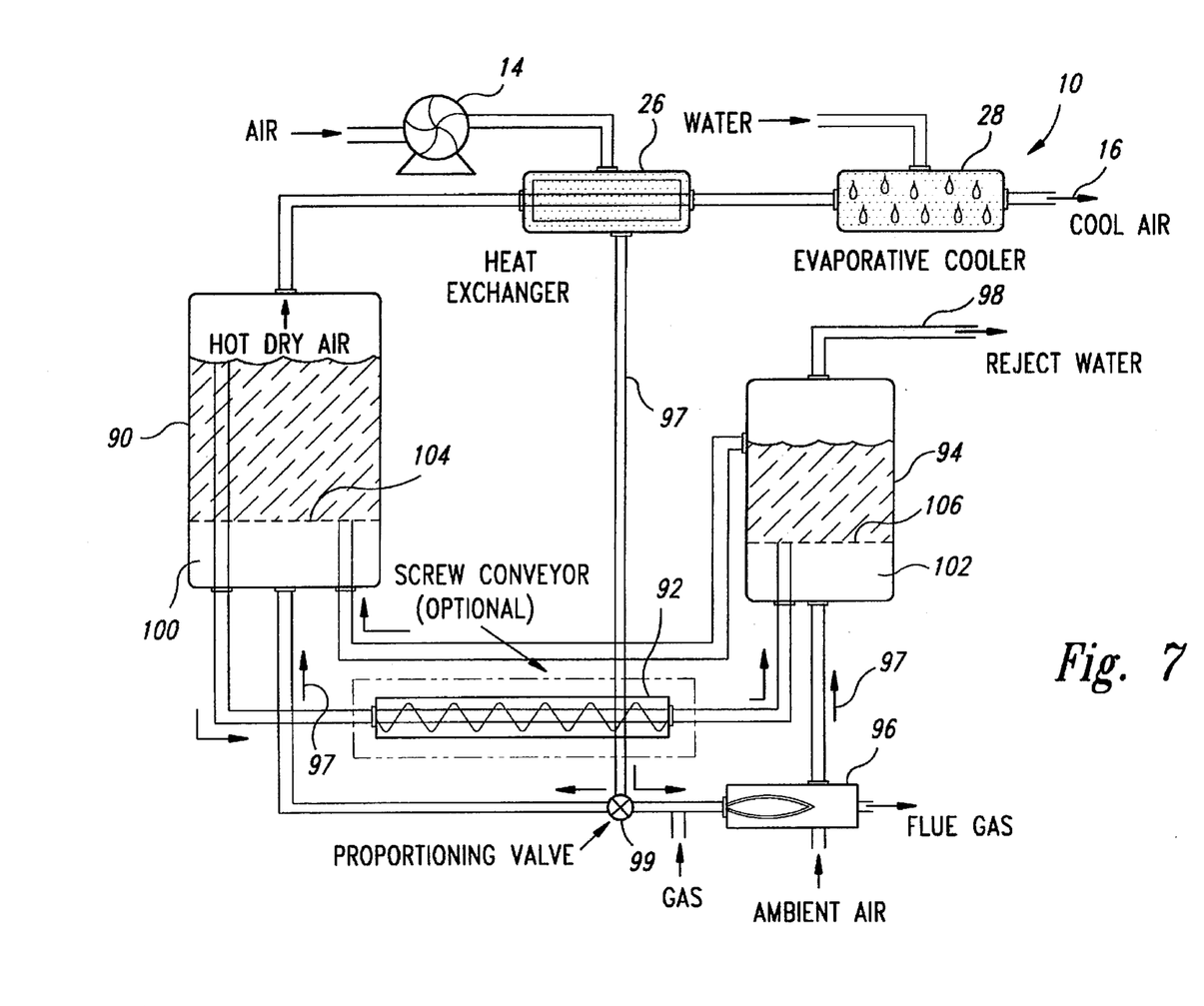
FIG. 7 is a schematic view of an alternative embodiment of the invention.

FIG. 7 illustrates an alternative embodiment of a system 10 constructed in accordance with the invention. There, the air supply path described above is essentially the same. Rather than alternate the flow of supply and return air through two parallel fluidized bed desiccators 20, 22, as shown in FIG. 3, the FIG. 7 embodiment uses a single fluidized bed 90. As the desiccant becomes moisturized, it is removed by a mechanical screw conveyor 92 which passes some of the desiccant material into a regenerator 94. There, heated supply air is passed through the regenerator 94 from an indirect heat exchanger using a gas burner 96.

The gas burner arrangement 96 indirectly heats the supply air 97. A proportioning valve 99 is used to divide the incoming air stream between the burner 96 and desiccant bed 90. The rest of the heated supply air causes moisture in the desiccant material to be absorbed. It is then exhausted to the ambient as shown at 98. Regenerated desiccant is moved back to the fluidized bed 90 by the screw conveyor 92 or by other mechanical or pneumatic means.

In the FIG. 7 embodiment, plenum chambers 100, 102 respectively underlie the single fluidized bed desiccator 90 and the regenerator 94. Pressurized supply air 97, driven by blower 14, passed upwardly through distribution plates 104, 106 in the same manner as described above for the parallel desiccators 20, 22 shown in FIG. 1.

The sensible heat exchangers 26, 36 as described above would be familiar to a person skilled in the art. There are several options available for constructing adequate sensible heat exchangers. Fin plate, heat wheel, and fluid heat exchangers are all design possibilities which are known in the art.

In the fin plate exchanger, an indirect heat exchanger is fabricated from sheet metal and used to exchange energy between the supply and regeneration airstreams. Fins are added parallel to the airflow as a means of extending the heat transfer area with a minimum pressure drop.

In the heat wheel exchanger, wheels are slowly rotated through the supply and regeneration airstreams. A fluid exchanger design relies on circulating a heat transfer fluid between the two heat exchangers. It is believed that a fluid exchanger may be the preferable design because of cost and maintenance considerations.

The evaporative coolers 28, 34 can be made from any one of a variety of humidifier designs. Two common designs are the pan type and wetted element type humidifiers which are currently used in many residential applications. The pan type relies on one or more water absorbent plates which are partially immersed in a pan of water that is usually maintained at a constant level with a float control. The plates are continually wetted by a wicking action. Air contacts the plates above the water level and is humidified in that manner. In the wetted element type, water is continually circulated to the top of a water absorbent material by the use of a recirculation pump. The air picks up water from the absorbent material as it passes over it. It is believed that the wetted element type would be preferable for use in connection with the air conditioning system disclosed here.

The regeneration heater could be constructed in a number of different ways. Preferably, it should be a natural gas-fired combustion system as described above. Similar systems are presently used in residential gas furnaces. These systems have a clam-shell type indirect heat exchanger that provides very high efficiency with low pressure drops. It would also be possible to generate heat by using other means such as, for example, electrical heating elements or a microwave generator.

Obtaining a desiccant with suitable properties is paramount to the successful operation of the system 10. A fluidized bed configuration requires desiccants that can withstand the repeated cycling and physical impact with each other caused by the air flow described above. In preferred form, the desiccant particles should be spherical in shape. This would eliminate corners or edges which could break off during the fluidization process.

Preferably, the spheres should be in the range of 1-5 millimeters in diameter. To the extent possible, all particles should have the same diameter and shape. The particles should have the highest surface hardness possible and strong resistance to fracturing. Some desiccants are more susceptible to attrition at higher moisture loadings. The desiccant used in connection with the system 10 should be of a type that maintains consistent adsorption/desorption performance during repeated cycling over a long period of time. It is believed that solid particle desiccants such as silica gel, silica/alumina blends, and molecular sieve classes would be suitable for use in the system 10.

The above description sets forth the best mode for carrying out the invention as it is presently known. It is to be appreciated that future developments and changes may be made to the system as described above. Consequently, it is not intended that the preceding description should limit the scope of patent protection. Instead, the scope of patent protection is to be limited solely by the patent claim or claims which follow, the interpretation of which is to be made in accordance with the well-established doctrines of patent claim interpretation.

What is claimed is:

1. An air conditioning unit, comprising:

a first blower received in the unit for driving supply air along a path through the unit and into a space that is to receive conditioned air;

a first fluidized bed desiccator received in the unit, the desiccator being sized and shaped for holding particles of a desiccant material, the first desiccator having a surface for supporting the desiccant material particles, the supporting surface being arranged relative to the supply air path and structurally adapted so that supply air may be selectively driven by the blower upwardly through the supporting surface and into the desiccant material particles, thereby creating a fluidized bed of desiccant material particles for removing moisture from the supply air;

a second fluidized bed desiccator received in the unit, the second desiccator being arranged parallel to the first desiccator for selectively receiving supply air, and further, the second desiccator being sized and shaped for holding particles of a desiccant material, the second desiccator also having a surface for supporting the desiccant material particles held by the second desiccator, the supporting surface of the second desiccator being arranged relative to the supply air path and structurally adapted so that supply air may be selectively driven by the blower upwardly through the supporting surface of the second desiccator and into the desiccant material particles held by the second desiccator, and further including a first transfer plenum arranged in the supply air path upstream of the first and second desiccators, the first transfer plenum being adapted to selectively direct supply air through only one of the first and second desiccators at a time;

a second transfer plenum arranged in the supply air path downstream of the first and second desiccators, the second transfer plenum being adapted to selectively direct supply air downstream from one of the first and second desiccators.

a first sensible heat exchanger in the supply air path, downstream of the first and second desiccators, the sensible heat exchanger reducing the temperature of the supply air after it exits one of the selected desiccators; and a first evaporative cooler in the supply air path, downstream of the sensible heat exchanger, for at least partially humidifying the supply air and further reducing its temperature prior to entering the conditioned air space.

2. The air conditioning system of claim 1, further including:

a second blower received in the unit for driving return air from the conditioned air space along a regeneration air path through the system;

a second evaporative cooler in the regeneration air path, for at least partially humidifying the return air;

a second sensible heat exchanger in the regeneration air path downstream of the second evaporative cooler, the second sensible heat exchanger increasing the temperature of the return air;

a regeneration heater arranged in the regeneration air path for receiving return air from the second evaporative cooler, the regeneration heater being adapted to increase the temperature of the return air sufficiently to regenerate moisturized desiccant material, and further, the regeneration heater being arranged upstream of the first transfer plenum, for delivering heated return air to the first transfer plenum, and wherein the first transfer plenum is adapted to deliver the heated return air to a selected one of the first and second fluidized bed desiccators, and still further, the second transfer plenum is adapted to exhaust the heated return air after it passes through the selected desiccator.

3. The air conditioning system of claim 2, further including:

means for splitting the flow of return air passing from the second evaporative cooler to the regeneration heater, and for delivering a portion of the return air to the regeneration heater and exhausting the remaining portion of the return air.

4. The air conditioning system of claim 1, wherein the first desiccator comprises a hollow cylindrical chamber having a bottom plate for supporting the desiccant material particles.

5. The air conditioning system of claim 4, wherein the bottom plate is perforated for allowing supply air to pass upwardly therethrough.

6. The air conditioning system of claim 4, wherein the bottom plate includes a screen portion for allowing supply air to pass therethrough.

7. The air conditioning system of claim 1, wherein the second desiccator comprises a hollow cylindrical chamber having a bottom plate for supporting the desiccant material particles.

8. The air conditioning system of claim 7, wherein the bottom plate is perforated for allowing supply air to pass upwardly therethrough.

9. The air conditioning system of claim 7, wherein the bottom plate includes a screen portion for allowing supply air to pass therethrough.

* * * * *